Figure 1:
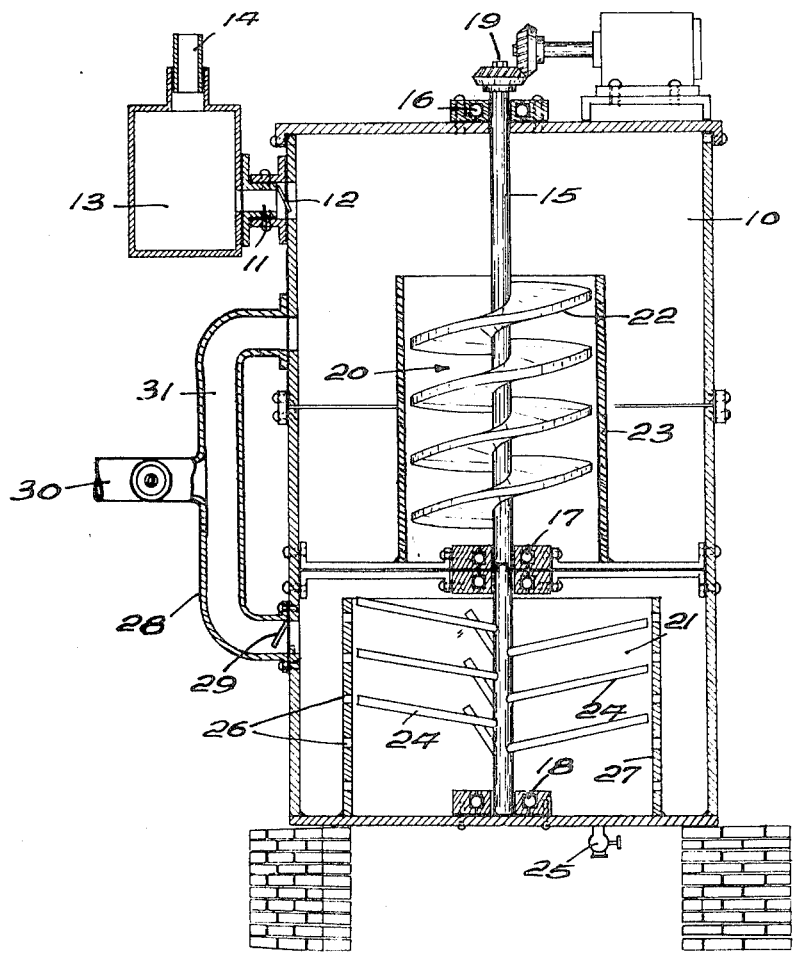

United States Patent

Soria et al.

[15] 3,648,435
[45] Mar. 14, 1972

[54] METHOD AND APPARATUS FOR PURIFYING EXHAUST GASES

[72] Inventors: Alberto Olague Soria, Calle Uruguay 37 Desp. 313; Avelino Martinez Sanchez, Avenue Emerson #215, both of Mexico City, Mexico

[22] Filed: Mar. 9, 1970

[21] Appl. No.: 17,717

[30] Foreign Application Priority Data

Apr. 15, 1969 Mexico ................................. 110404
Apr. 15, 1969 Mexico ................................. 110405
Apr. 15, 1969 Mexico ................................. 110406

[52] U.S. Cl. ............................ 55/86, 55/230, 55/244
[51] Int. Cl. ................................................ B01d 47/02
[58] Field of Search ............ 55/83, 84, 86, 95, 230–232, 55/244, 247; 261/88, 121

[56] References Cited

UNITED STATES PATENTS

| 2,203,835 | 6/1940 | Minor | 55/230 |
| 2,736,391 | 2/1956 | Jones | 55/231 |
| 632,370 | 9/1899 | Rossler | 55/230 |
| 3,495,440 | 2/1970 | Koblin et al. | 55/95 |
| 1,547,924 | 7/1925 | Kerschbaum | 55/83 |

FOREIGN PATENTS OR APPLICATIONS 15,675 12/1934 Australia ................................. 55/247

Primary Examiner—Charles N. Hart
Attorney—Pierce, Scheffler & Parker

[57] ABSTRACT

Apparatus and method for removing impurities and noxious materials from exhaust gases generated by the combustion of fuels in which the gases are passed through a chamber for extraction of the impurities and noxious materials by an absorber liquid.

7 Claims, 2 Drawing Figures

METHOD AND APPARATUS FOR PURIFYING EXHAUST GASES

Whenever combustible fuels are burned, the products of combustion or exhaust gases contain components which are harmful to mankind. These harmful components may be gases or vapors of a poisonous character, that is poisonous to mankind or then may be finely divided solids, such as soot, fly ash and the like which in the air forms smoke and when water vapor such as fog is present form "smog."

The presence of poisonous gases or vapors and solid particles in exhaust gases creates major problems as to the purity of the air in many communities and particularly in highly industrialized areas where great quantities of exhaust gases from the combustion of various types of fuel is encountered.

The apparatus of the present invention is for the purification of exhaust gases so that the poisonous gases and vapors present as well as undesirable solid particles are removed from the exhaust gases and are retained in the apparatus while the purified gases may be expelled therefrom.

According to the present invention the apparatus may be connected directly to the exhaust pipe of an industrial plant or it may be located at a central point so as to receive the exhaust gases from a plurality of sources through pipes or other connections thereto.

The gases which are treated in the apparatus and by the method of the present invention are subject to a turbulent mixing action with an absorber liquid. The absorber liquid may act as a chemical absorbent of various noxious gases and/or may act as a mechanical entrainer for solid particles therein, such as soot, fly ash and the like. In any particular installation, the nature of the impurities to be removed are considered and the absorber liquid is selected from those materials which will effectively absorb and/or entrain the impurities present. For example when soot or fly ash or the like is to be removed, the absorber liquid might well include an oily liquid, such as a mineral oil for entraining such solid particles to effectively remove them from the exhaust gases. On the other hand, when noxious gases are to be removed the absorber liquid will contain a liquid such as, water, which will absorb by solution or by chemical reaction those noxious gases which are to be removed from the exhaust gases. Clearly, when both solid particles and noxious gases such as carbon monoxide are present in the exhaust gases the absorber liquid may advantageously contain both an oily entraining agent as well as an absorbent and even though the two liquids might be immiscible in each other, this does not interfere with the operation of the present apparatus because of the turbulent mixing action in an agitation chamber where the exhaust gases are effectively scrubbed to purify them.

Figure 2:
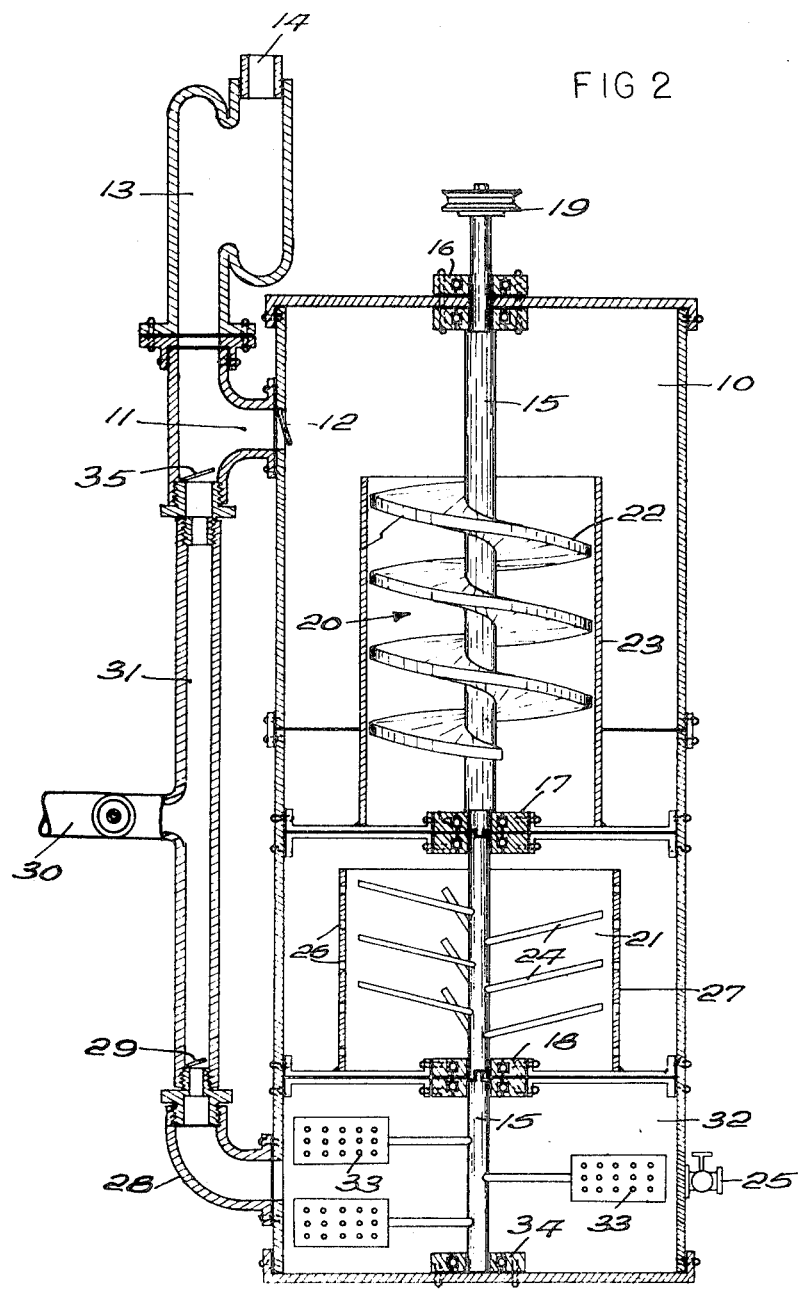

The invention will now be described by reference to the accompanying drawings in which similar reference numbers refer to similar parts and in which, FIG. 1 is a vertical cross sectional view of an apparatus according to the present invention and in which the method of the present invention may be carried out and FIG. 2 is a vertical cross sectional view of a modification of the apparatus of the present invention.

In FIG. 1 apparatus is shown which comprises a chamber 10 having an inlet 11 provided with a nonreturn valve 12 for the admission of exhaust gases from an antechamber 13 supplied by inlet duct 14 which is connected to a source of exhaust gases. The gases which enter chamber 10 cannot exit through inlet 11 because of nonreturn valve 12.

Within the chamber 10 there is provided a shaft 15, rotatably mounted in bearings 16, 17 and 18 and driven by any suitable drive 19. Within the chamber 10 an impeller 20 is provided for moving the exhaust gases downwardly to a second chamber, or extraction chamber 21. As shown, the impeller 20 includes a helical drive 22 disposed within a tubular guide 23 and mounted on the rotatable shaft 15.

In the extraction chamber 21 there are provided mixing and agitation elements 24 mounted on the lower end of shaft 15 and rotatable therewith. An absorber liquid may be introduced into chamber 21 through inlet 25.

When shaft 15 is rotated, the agitation element 24 will cause the absorber liquid to become agitated and actively intermixed with the gases being propelled downwardly thereinto by the impeller 20. The violent intermixing of the downwardly moving gases and the absorber liquid enables substantially all of the undesired components of the gas to be absorbed and/or entrained by the liquid. Those components which are not absorbed or entrained pass through openings 26 in the wall 27 to be withdrawn through pipe 28.

The gases which pass through the pipe 28 and nonreturn valve 29 may be withdrawn at 30 or may be recycled in whole or in part through pipe 31 to chamber 10 to be recycled through the apparatus.

When the absorber liquid is saturated with impurities it may be replenished by withdrawing the spent liquid at 25 and introducing fresh absorber liquid to the chamber 21.

In the modification shown in FIG. 2 like elements have like reference numerals. At the bottom of the apparatus below the chamber 21, a further mixing chamber 32 with additional agitation elements 33 is provided. The elements 33 are mounted for rotation on the shaft 15 and due to its extension through chamber 32 additional bearings 34 are provided. The elements 33 may be composed of an absorbent porous material which will tend to retain the absorber liquid containing the impurities. These elements 33 may be exchanged for fresh elements when the absorber liquid is changed as mentioned above.

As stated in connection with FIG. 1 the cleaned gases are passed into pipe 28 and may be withdrawn at 30, or in whole or in part recycled to the top of the apparatus. In FIG. 2 this is accomplished by extending pipe 31 to connect with the inlet 11 as shown, employing a nonreturn valve 35 as shown.

With the present apparatus it is possible to purify exhaust gases from any source easily and effectively due to the agitation and mixing that takes place in the chamber 21, and, in FIG. 2, also in chamber 32.

The size of the apparatus depends on the quantity of gases to be purified. Obviously when treating the gases from an industrial heating plant, a larger apparatus will be employed than when treating the exhaust gases from a single internal combustion engine as found in an automobile. In the latter case, of course the drive 19 for shaft 15 may be connected directly to the automobile engine instead of employing a separate motor.

Having now described our invention and a manner for carrying it out what is claimed is:

1. Apparatus for removing unwanted components from exhaust gases comprising an inlet chamber, means for introducing the exhaust gases into said inlet chamber, a purification chamber beneath and in communication with said inlet chamber, means including a helical rotating blade and a vertical tubular guide thereabout disposed vertically within said inlet chamber for impelling the gases downwardly from said inlet chamber into said purification chamber, a liquid bath in said purification chamber for absorbing and entraining the unwanted components from the exhaust gases, means for agitating said liquid bath to cause violent intermixing of the gases with the liquid in said purification chamber to facilitate the absorption and entrainment of the unwanted components from the exhaust gases as the gases pass downwardly through said purification chamber and means for withdrawing gases from said purification chamber after absorption and entrainment of unwanted components.

2. Apparatus as claimed in claim 1 wherein the means for impelling the gases and the agitating means include a common rotatable shaft extending from the inlet chamber to the purification chamber and further comprises means for rotating said shaft.

3. Apparatus as claimed in claim 2 wherein said agitating means comprises stirring elements mounted on said shaft for rotation therewith.

4. Apparatus as claimed in claim 1 and further comprising means for recycling at least a portion of the withdrawn gases to said inlet chamber for additional treatment.

5. Apparatus as claimed in claim 1 wherein the means for introducing the exhaust gases into said inlet chamber includes a nonreturn valve to prevent gases from returning to the inlet means after entering the inlet chamber.

6. Apparatus as claimed in claim 1 wherein said purification chamber includes means for withdrawing said liquid bath from said purification chamber after substantial saturation thereof, and for introducing a fresh bath into said purification chamber.

7. A method for removing unwanted components from exhaust gases comprising introducing said exhaust gases into an inlet chamber, passing said exhaust gases downwardly through a confined zone within said inlet chamber to a purification chamber, agitating an absorber liquid within said purification chamber and continuously passing the exhaust gases downwardly through said confined zone and thence through the agitated absorber liquid for violent intermixing therewith and removing purified gases after intermixing with said liquid, said absorber liquid being formed of at least one liquid for mechanical entrainment of solid impurities and for absorption of vaporous impurities.

* * * * *